(12) United States Patent
Sagal et al.

(10) Patent No.: US 7,476,702 B2
(45) Date of Patent: Jan. 13, 2009

(54) POLYMER ELECTRONIC DEVICE PACKAGE HAVING HIGH THERMAL CONDUCTIVITY AND DIELECTRIC STRENGTH

(75) Inventors: E. Mikhail Sagal, Watertown, MA (US); Kevin A. McCullough, Warwick, RI (US); James D. Miller, Marietta, GA (US)

(73) Assignee: Cool Options, Inc., Warwick, RI (US)

( * ) Notice: Subject to any disclaimer, the term of this patent is extended or adjusted under 35 U.S.C. 154(b) by 455 days.

(21) Appl. No.: 11/118,057

(22) Filed: Apr. 29, 2005

(65) Prior Publication Data
US 2005/0189523 A1  Sep. 1, 2005

Related U.S. Application Data

(62) Division of application No. 10/292,970, filed on Nov. 13, 2002, now abandoned.

(60) Provisional application No. 60/338,127, filed on Nov. 13, 2001.

(51) Int. Cl.
*C08K 3/10* (2006.01)
*C08K 3/40* (2006.01)
*H01L 23/29* (2006.01)

(52) U.S. Cl. .................. 524/404; 524/430; 524/494; 257/789

(58) Field of Classification Search .......... 524/404, 524/494; 257/789
See application file for complete search history.

(56) References Cited

U.S. PATENT DOCUMENTS

| 3,564,109 | A | 2/1971 | Ruechardt | 174/15 |
|---|---|---|---|---|
| 5,194,935 | A | 3/1993 | Kitano et al. | 257/706 |
| 5,371,404 | A | 12/1994 | Juskey et al. | 257/659 |
| 5,835,679 | A | 11/1998 | Eckman et al. | 392/503 |
| 5,930,459 | A | 7/1999 | Eckman et al. | 392/503 |
| 5,982,623 | A | 11/1999 | Matsuo et al. | 361/719 |
| 6,048,919 | A | 4/2000 | McCullough | 524/404 |
| 6,162,849 | A * | 12/2000 | Zhuo et al. | 524/404 |
| 6,191,204 | B1 | 2/2001 | Johnson | 524/439 |
| 6,251,978 | B1 | 6/2001 | McCullough | 524/404 |
| 6,263,158 | B1 * | 7/2001 | Rutherford | 392/503 |
| 6,319,602 | B1 | 11/2001 | Fauzi et al. | 428/366 |
| 6,600,633 | B2 | 7/2003 | Macpherson et al. | 360/265.8 |
| 2002/0111415 | A1 | 8/2002 | Mack, Sr. et al. | 524/496 |
| 2003/0181560 | A1 | 9/2003 | Kawaguchi et al. | 524/424 |

FOREIGN PATENT DOCUMENTS

JP  402164054 A  6/1990

\* cited by examiner

*Primary Examiner*—Tae H Yoon
(74) *Attorney, Agent, or Firm*—Barlow, Josephs & Holmes, Ltd.

(57) ABSTRACT

A polymer composition having high thermal conductivity and dielectric strength is provided. The polymer composition comprises a base polymer matrix and a thermally-conductive, electrically-insulating material. A reinforcing material such as glass can be added to the composition. The polymer composition can be molded into packaging assemblies for electronic devices such as capacitors, transistors, and resistors.

5 Claims, 1 Drawing Sheet

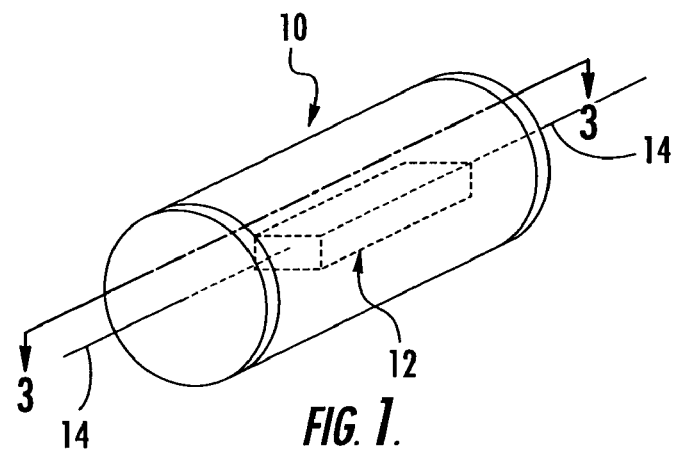
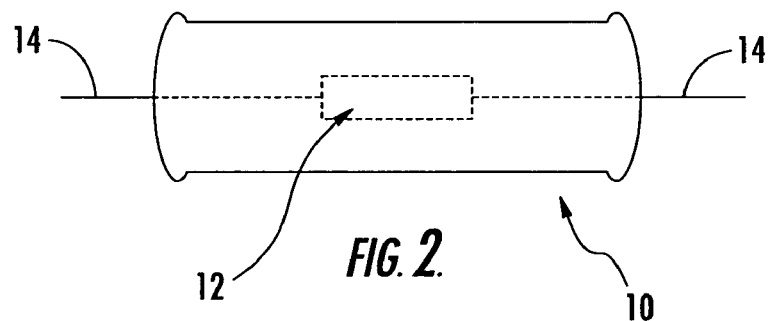
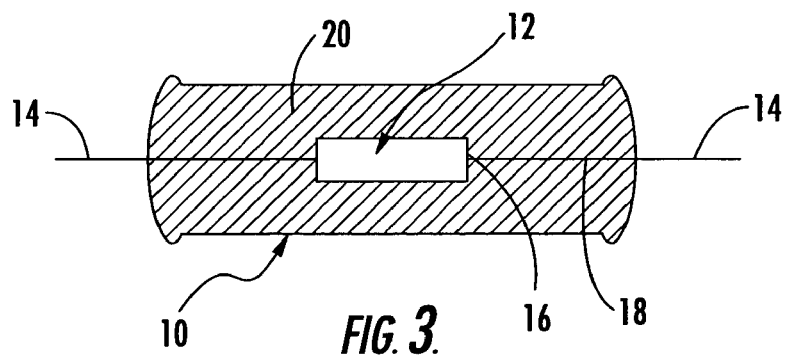
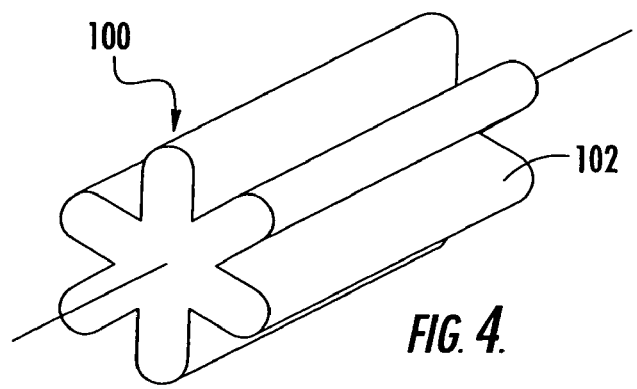

POLYMER ELECTRONIC DEVICE PACKAGE HAVING HIGH THERMAL CONDUCTIVITY AND DIELECTRIC STRENGTH

CROSS-REFERENCE TO RELATED APPLICATIONS

This application is a divisional of and claims priority from U.S. patent application Ser. No. 10/292,970, filed Nov. 13, 2002, now abandoned which claims the benefit of U.S. Provisional Application 60/338,127 having a filing date of Nov. 13, 2001.

BACKGROUND OF THE INVENTION

The present invention generally relates to polymer compositions having high thermal conductivity and dielectric strength. Particularly, the polymer composition comprises a base polymer matrix and a thermally-conductive, electrically-insulating material. The invention also encompasses molded packaging assemblies for electronic devices such as capacitors, transistors, and resistors. The invention further includes methods for making such packaging assemblies.

Electronic devices such as semiconductors, microprocessors, circuit boards, capacitors, transistors, and resistors can generate a substantial amount of heat that must be removed in order for the device to function properly. For example, a 1000-Ohm resistor in a 120 Volt circuit must dissipate 14 Watts of energy during operation. If the resistor is installed in a densely packaged circuit board, it is highly susceptible to overheating that can destroy the resistor and other components in the board. The industry has attempted to address this problem in a variety of ways.

For example, the electronic device may have a metallic outer cover. The cover can be made from aluminum or copper and installed onto the device. Although a metallic cover can dissipate a substantial amount of heat, it is electrically-conductive. Thus, an electrically-insulating layer must be placed between the device and cover. Although the electrically-insulating layer provides good electrical isolation, it is generally a poor thermal conductor. Thus, the electrically-insulating layer can prevent effective heat conduction between the device and device cover.

It is also common to employ heat pipes having a metal casing to help remove heat from a heat-generating object. In addition, metal heat spreaders in a laptop computer may be employed for transferring and dissipating heat. While these metal components can effectively dissipate heat and have good mechanical strength, they are typically electrically-conductive. Therefore, these components must be electrically insulated from the heat-generating components so as not to interfere with their electrical operation.

The industry uses thermally-conductive polymeric compositions in an attempt to overcome some of the negative aspects found with metallic heat transfer components. These thermally-conductive polymeric compositions have some advantages over metallic components. For example, the polymeric compositions can be injection-molded into parts having complex geometries such as interface pads which are placed between the heat-generating device and heat sink. The injection-molding process is effective, because it can produce a "net-shape" part. The final shape of the part is determined by the shape of the mold cavity. No further machine tooling is required to produce the final shape of the part. In contrast, such additional machine processing is often needed for shaping metallic parts, and this processing can be costly and time-consuming. In addition, polymer materials are often lighter and less costly than metallic parts.

McCullough, U.S. Pat. No. 6,251,978 (the '978 patent) discloses a thermally and electrically-conductive composite material that is net-shape moldable. The '978 patent discloses a composition containing: a) between 30 to 60% by volume of a polymer base matrix, b) between 25 to 60% by volume of an electrically-conductive filler having a relatively high aspect ratio of at least 10:1, and c) between 10 to 25% by volume of an electrically-conductive filler having a relatively low aspect ratio of 5:1 or less. The '978 patent discloses that the materials employed for the high aspect and low aspect ratio fillers may be selected from the group consisting of aluminum, alumina, copper, magnesium, brass, and carbon.

As described in the '978 patent, fillers used in conventional polymer compositions are typically thermally and electrically-conductive. For example, when a polymer base matrix is loaded with carbon fibers and metallic flakes to enhance the thermal conductivity of the composition, the composition is also quite electrically-conductive. As a result, parts made from thermally-conductive polymer compositions also generally require an additional electrically-insulating layer when placed in contact with electrically-conductive, heat-generating devices.

In view of the foregoing problems, it would be desirable to have a polymer composition with high thermal conductivity as well as high dielectric and mechanical strength. Such a composition should be capable of being molded into a packaging assembly for electronic devices. The present invention provides such a polymer composition. The invention also encompasses molded packaging assemblies for electronic devices. The invention further includes methods for making such packaging assemblies.

SUMMARY OF THE INVENTION

This invention relates to relates to polymer compositions having high thermal conductivity and dielectric strength. The polymer composition comprises: a) 20% to 80% by weight of a polymer matrix, and b) 20% to 80% by weight of a thermally-conductive, electrically-insulating ceramic material. The polymer composition may further comprise 3% to 50% by weight of a reinforcing material. The polymer matrix can be a thermoplastic or thermosetting polymer. The thermally-conductive, electrically-insulating ceramic material can be selected from the group consisting of alumina, calcium oxide, titanium oxide, silicon oxide, zinc oxide, silicon nitride, aluminum nitride, boron nitride, and mixtures thereof. The reinforcing material can be glass, inorganic minerals, or other suitable material.

The present invention also encompasses an electronic device package assembly, comprising: i) an electronic device having a front side, rear side, left side, right side, bottom side, and top side; ii) a molded cover disposed about said electronic device and in thermal communication with at least said front side, rear side, left side, right side, and top side of said electronic device, and iii) at least two wire leads, said wire leads emanating from said electronic device and protruding through said molded cover. The molded cover is made from the thermally-conductive, electrically-insulating polymer composition of this invention. The present invention further includes a method of manufacturing an electronic device package assembly. The method involves the steps of providing an electronic device and molding the thermally-conductive, electrically-insulating polymer composition of this invention over the device.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

FIG. 1 is a perspective view of the device cover and electronic package assembly of the present invention;

FIG. 2 is a top view of the device cover and electronic package of the present invention of FIG. 1;

FIG. 3 is a cross-sectional view of the electronic device along line 3-3 of FIG. 1; and FIG. 4 is a perspective view of an alternative embodiment of the invention.

DETAILED DESCRIPTION OF THE PREFERRED EMBODIMENTS

The present invention relates to polymer compositions having high thermal conductivity and high dielectric and mechanical strength. The invention also encompasses molded packaging assemblies for electronic devices. The invention further includes methods for making such packaging assemblies.

A thermoplastic polymer selected from the group consisting of polycarbonate, polyethylene, polypropylene, acrylics, vinyls, fluorocarbons, polyamides, polyesters, polyphenylene sulfide, and liquid crystal polymers such as thermoplastic aromatic polyesters can be used to form the matrix. Alternatively, thermosetting polymers such as elastomers, epoxies, polyimides, and acrylonitriles can be used. Suitable elastomers include, for example, styrene-butadiene copolymer, polychloroprene, nitrile rubber, butyl rubber, polysulfide rubber, ethylene-propylene terpolymers, polysiloxanes (silicones), and polyurethanes.

The thermally-conductive, electrically-insulating ceramic material imparts thermal conductivity to the non-conductive polymeric matrix. The thermally-conductive, electrically-insulating ceramic material can be selected from the consisting of alumina, calcium oxide, titanium oxide, silicon oxide, zinc oxide, silicon nitride, aluminum nitride, boron nitride, and mixtures thereof. Mixtures of such materials are also suitable. As discussed in more detail below, carbon materials such as carbon fibers and flakes are not used in the compositions of the present invention since such materials tend to detrimentally effect the composition's electrically-insulating properties.

The thermally-conductive, electrically-insulating material may be in any suitable form such as granular powder, particles, whiskers, and fibers. The particles can have a variety of structures. For example, the grains can have flake, plate, rice, strand, hexagonal, or spherical-like shapes.

The ceramic material may have a relatively high aspect (length to thickness) ratio of about 10:1 or greater. Alternatively, the ceramic material may have a relatively low aspect ratio of about 5:1 or less. For example, boron nitride grains having an aspect ratio of about 4:1 can be used. Both low aspect and high aspect ratio ceramic materials can be added to the polymer matrix.

While not wishing to be bound any theory, it is believed that the polymer compositions of this invention have good electrical insulation properties due to their ability to prevent localized heat build-up and degradation of the polymer. Particularly, the failure of plastics in most electrical insulation or dielectric property tests can be described as a result of the following phenomena:

1) localized charge build-up,
2) localized heating due the localized charge,
3) degradation of the polymer due to excessive heat,
4) eventual conversion of a portion of the polymer to carbon, and
5) the carbon (electrically conductive) provides an electrical current path and thus failure of the material as an electrical insulator.

In contrast, the polymer compositions of this invention have good thermal conductivity; thus, they prevent the localized build-up of heat and degradation of the polymer.

The optional reinforcing material can be glass, inorganic minerals, or other suitable material. Preferably, a reinforcing material is used, because it strengthens the polymer matrix and enhances the dielectric properties of the composition. The reinforcing material is preferably chopped glass.

The polymer matrix preferably constitutes about 20 to about 80% by weight, and the thermally-conductive, electrically-insulating material preferably constitutes about 20 to about 80% by weight of the composition. The reinforcing material, if added, constitutes about 3% to about 50% by weight of the composition.

The thermally-conductive, electrically-insulating material and reinforcing material are intimately mixed with the non-conductive polymer matrix to form the polymer composition. The loading of the thermally-conductive, electrically-insulating material imparts thermal conductivity and dielectric strength to the polymer composition. The loading of the reinforcing material enhances the mechanical strength of the composition. If desired, the mixture may contain additives such as, for example, flame retardants, antioxidants, plasticizers, dispersing aids, and mold-releasing agents. The mixture can be prepared using techniques known in the art. Preferably, the ingredients are mixed under low shear conditions in order to avoid damaging the structure of the thermally-conductive, electrically-insulating materials.

Preferably, the polymer compositions have a thermal conductivity of greater than 3 W/m°K and more preferably greater than 22 W/m°K. These heat conduction properties allow the finished article to effectively dissipate heat from a heat-generating source. The composition also has good electrical-insulation properties. For example, the polymer composition preferably has a volume resistivity of greater than $1.0 \times 10^{16}$ ohms-cm and a surface resistivity of greater than $7.0 \times 10^{14}$ ohms; a dielectric strength (breakdown voltage) of at least 44,000 on a specimen having a thickness of about 0.05 inches; a comparative tracking index (Volts) of at least 500; an Arc Resistance of at least 300 seconds; and a hot wire ignition of greater than 120 seconds as described in further detail in the Examples below.

The polymer composition can be molded into any desired article using a melt-extrusion, injection-molding, casting, or other suitable process. An injection-molding process is particularly preferred. In general, this process involves loading pellets of the composition into a hopper. The hopper funnels the pellets into a heated extruder, wherein the pellets are heated and a molten composition (liquid plastic) forms. The extruder feeds the molten composition into a chamber containing an injection piston. The piston forces the molten composition into a mold. The mold may contain two molding sections that are aligned together in such a way that a molding chamber or cavity is located between the sections. The material remains in the mold under high pressure until it cools. The shaped article is then removed from the mold. The shaped articles of the present invention have several advantageous properties. Preferably, the article has a thermal conductivity of greater than 3 W/m°K, and more preferably it is greater than 22 W/m°K. Further, the article preferably has the electrical insulation properties as described above for the polymer composition.

Further, the shaped articles of this invention are net-shape molded. This means that the final shape of the article is determined by the shape of the molding sections. No additional processing or tooling is required to produce the ultimate shape of the article.

Referring to FIGS. 1 and 2, the thermally-conductive and electrically-insulating polymer composition of this invention can be over-molded an electronic device 12 to produce an integrated cover and electronic device packaging assembly 10. (The electronic device 12 is shown as a resistor for illustration purposes only.) The polymer composition of this invention is molded completely around electronic device 12 to substantially embrace it and seal it on all sides. The polymer composition is molded around and about electronic device 12 so that it does not interfere with the interconnecting wire leads 14 emanating therefrom. The polymer composition effectively seals the electronic device 12 from exposure to dust and moisture.

Referring to FIG. 3, the moldable polymer composition 20 is over-molded the electronic device 12, emanation point 16, and upper portion 18 of the wire leads 14 to produce the package assembly 10. By over-molding the polymer composition 20 directly onto the electronic device 12, emanation point 16, and upper portion 18 of the wire leads 14, the composition 20 comes into and remains in direct contact with these components. The critical wire leads 14 are allowed to protrude through the molded cover formed by the polymer composition 20. This over-molding process produces an effective hermetic seal around the electronic device 12. The seal formed by polymer composition 20 environmentally protects and electronically isolates the electronic device 12. The seal has high dielectric and mechanical strength. Further, the seal provides an effective means for dissipating heat from the electronic device 12, since the polymer composition 20 is thermally-conductive.

The over-molding process can be performed using techniques known in the art. For example, the electrical device 12 can be placed into a cavity of an injection-molding die (not shown) so that the wire leads 14 are allowed to protrude therefrom. Once the electrical device 12 is inserted into the mold cavity, the cavity is flooded with the moldable polymer composition of this invention. The integrated package assembly 10 is then removed from the mold. The package assembly 10 is net-shape molded meaning that the final shape of the assembly 10 is determined by the shape of the mold. No further machine tooling or processing is required to produce the final shape of the molded package assembly 10. The package assembly 10 is ready "as is" for assembly into a finished product (not shown).

Turning to FIG. 4, an alternative embodiment of the cover and electronic device packaging assembly 100 is shown. Additional integrated heat dissipating members 102 are provided to further enhance the thermal conductivity of the package assembly 100. The heat dissipating members 102 are shown in the form of fins in FIG. 4 for illustration purposes only. The heat dissipating members 102 can have other structures. For example, the heat dissipating members 102 can be in the form of pins or other structures depending upon the intended application of the package assembly 100. It should also be noted that heat dissipating members 102 extend so as to surround an electronic device (not shown) embedded in the package assembly 100. The direction of the heat dissipating members 102 can be varied depending upon the intended application of the assembly 100.

The package assembly of the present invention has a wide range of applications. For example, the assembly can be used on any circuit board or similar substrate where electrical device packages are needed. The assembly can be used where the circuit board containing the heat-generating device is completely encased in a housing such as a Pentium II chip configuration. In this arrangement (not shown), a heat sink assembly may be molded directly over the housing of the heat-generating device, and the step of providing a plastic casing over the device can be eliminated.

The present invention is further illustrated by the following examples and test methods, but these examples and test methods should not be construed as limiting the scope of the invention.

EXAMPLES

In the following Examples, a thermally-conductive composition comprising about 60 weight % boron nitride particles, about 30 weight % polyphenylene sulfide (PPS), and about 10 weight % of chopped glass based on the weight of the composition was prepared, and various electrical properties of the composition were measured. The measurements were taken on three (3) to five (5) samples of the polymer composition. The test methods used to measure the electrical properties and results are reported below.

Volume Resistivity and Surface Resistivity

The Volume Resistivity (ohms-cm) and Surface Resistivity (ohms) was measured using ASTM-D-257-99. The method involved placing each specimen individually in a Resistivity Cell connected to a High Resistance Meter. Five Hundred VDC were applied to the specimen for 60 seconds. The resistance measurements were then taken. The resistivity was calculated using the following formulas:

Volume Resistivity:

$$V = \frac{19.6}{T} \times R$$

Where,
V=Volume Resistivity (ohms-cm);
R=measured volume resistance (ohms);
T=thickness (cm); and
19.6=effective area of the guarded cell ($cm^2$).

Surface Resistivity: S=18.8×R
Where,
S=Surface Resistivity (ohms);
R=Measured Surface Resistance (ohms); and
18.8=effective area of the guarded cell.

TABLE I

| Sample | Volume Resistivity (ohms-cm) | Surface Resistivity (ohms) |
|---|---|---|
| 1 | $1.7 \times 10^{16}$ | $1.4 \times 10^{16}$ |
| 2 | $1.8 \times 10^{16}$ | $7.5 \times 10^{14}$ |
| 3 | $2.1 \times 10^{16}$ | $1.2 \times 10^{16}$ |

Dielectric Constant and Dissipation Factor

The Dielectric Constant and Dissipation Factor were measured using ASTM-D-150-98. The thickness of each specimen was measured and recorded. Using an RF Impedance/Materials Analyzer, each specimen was placed in the testing fixture and the thickness measurement entered into the analyzer. Each specimen was allowed to stabilize and the Dielectric Constant and Dissipation Factor measurements were then taken at 1 MHz. Dimensions were recorded for each specimen for 100 Hz measurements. The frequency of the signal generator was varied around the calculated resonant frequency of the empty cavity until the output power indicated a maximum value. An attenuation was introduced at a power level 3 dB down from the resonant power level. Measurements of the resonant frequency and "Q" Quality factor were taken on the empty cavity with and without the test specimen. Test specimens were then mounted into the test cavity. The electric field inside the cavity was parallel to the length of the test specimen.

TABLE II

| Sample | Dielectric Constant | Dissipation Factor |
|---|---|---|
| @ 100 Hz | | |
| 1 | 4.81 | 0.0104 |
| 2 | 4.72 | 0.0328 |
| 3 | 4.86 | 0.0216 |
| @ 1 MHz | | |
| 1 | 3.66 | 0.0017 |
| 2 | 3.70 | 0.0021 |
| 3 | 3.67 | 0.0031 |

Dielectric Strength

The Dielectric Strength was measured using ASTM-D-149-97a. Electrode size (2.0"): Each specimen was immersed in Dow Corning 704 Silicone Oil. The cylindrical probes were placed in contact with the specimen. The voltage was then increased at a rate of 500 volts/second until breakdown or arc over occurred.

TABLE III

| Sample | Breakdown Voltage | Thickness (inches) | Volts/mil |
|---|---|---|---|
| 1 | 44,500 | 0.0504 | 883 |
| 2 | 45,200 | 0.0503 | 899 |
| 3 | 44,500 | 0.0498 | 894 |

Comparative Tracking Index

The Comparative Tracking Index was measured using ASTM-D-3638-98. The test area was cleaned to remove any dust, dirt, fingerprints, grease, oil, etc. Two opposing platinum electrodes were placed 4 mm apart on a flat horizontal surface of the specimen. The electrodes were supplied with a sinusoidal voltage, at a frequency of 60 Hz. A variable resistor was connected to the system in order to adjust the current between any short circuit in the electrodes. The surface of the specimen between the electrodes was wetted with drops of an Ammonium Chloride/Distilled Water solution. The drops fell centrally between the electrodes from a height of 40 mm. The drop size was regulated in accordance with the specification. The test was started by dripping the solution onto the surface of the test sample. Failure occurred when a current of 0.5 A or more flowed for at least 2 seconds in a conduction path between the electrodes, or if the specimen burned without releasing the over-current relay.

TABLE IV

| Sample | Comparative Tracking Index (Volts) |
|---|---|
| 1 | 600 |
| 2 | 525 |
| 3 | 600 |
| 4 | 600 |
| 5 | 575 |

Arc Resistance

The Arc Resistance was measured using ASTM-D-495-99. Each specimen was inserted into the tester with the electrode spacing set at 0.25". The arc tester was set in the automatic mode with 105 to 115V. The timer was set to 0 seconds. The tester was then started using the following sequence:

| Step | Current, mA | Time Cycle | Total Time, (sec) |
|---|---|---|---|
| ⅛ 10 | 10 | 0.25 sec/1.75 sec | 60 |
| ¼ 10 | 10 | 0.25 sec/0.75 sec | 120 |
| ½ 10 | 10 | 0.25 sec/0.25 sec | 180 |
| 10 | 10 | continuous | 240 |
| 20 | 20 | continuous | 300 |
| 30 | 30 | continuous | 360 |
| 40 | 40 | continuous | 420 |

When the arc disappeared and tracking occurred, the timer is stopped and the time was recorded. The electrodes were then cleaned for the next specimen.

TABLE V (Results)

| Sample | Arc Resistance (Seconds) |
|---|---|
| 1 | 303.9 |
| 2 | 302.1 |
| 3 | 302.9 |

Hot Wire Ignition

The Hot Wire Ignition was measured using ASTM-D-3874-97. The center portion of the test specimens were wrapped with an annealed test wire, using a winding fixture five complete turns were spaced ¼ inch apart. The free ends of the wire were connected to the test circuit, making sure the test specimen's length and width are horizontal. The circuit was then energized and the timer was started. The test specimen continued to heat, until ignition occurred. The power was then shut off and the elapsed time recorded. The test is discontinued if the test specimen fails to ignite within 120 seconds.

TABLE VI

| Sample | Time to Ignition (seconds) |
|---|---|
| 1 | >120 |
| 2 | >120 |
| 3 | >120 |
| 4 | >120 |
| 5 | >120 |

High Voltage Arc Tracking Rate

The High Voltage Arc Tracking Rate was measured using U1746A. Each test specimen was clamped in position under the electrodes. The electrodes were placed on the surface of the test specimen and spaced 4.0 mm from tip to tip. The circuit was then energized. As soon as the arc tracking appeared on the surface of the test specimen, the movable electrode was drawn away as quickly as possible while still maintaining the arc tracking. If the arc extinguishes, the spacing between the electrodes was shortened as quickly as possible until the arc was reestablished. Immediately following the reestablishment of the arc, the electrodes were then again withdrawn as quickly as possible. This process was repeated for 2 minutes of accumulated arcing time. The length of the conductive path or track was measured and the tracking rate was determined by dividing the length of the path in millimeters by the 2 minute arcing time. Any ignition of the test specimen, or a hole burned through the sample, was not recorded.

High-voltage arc-tracking-rate performance level categories (PLC)

| Range - tracking rate (mm/min) | Assigned PLC |
|---|---|
| 0 < TR ≦ 10 | 0 |
| 10 < TR ≦ 25.4 | 1 |
| 25.4 < TR ≦ 80 | 2 |
| 80 < TR ≧ 150 | 3 |
| 150 < TR | 4 |

TABLE VII (Results)

| Sample | Tracking Rate = 60 L/t (mm/min) |
|---|---|
| 1 | 0 |
| 2 | 0 |
| 3 | 0 |

Test specimens did not track.

High Voltage Arc Resistance to Ignition

Each test specimen was clamped in position under the electrodes. The electrodes were placed on the surface of the test specimen and spaced 4.0±0.1 mm from tip to tip. The circuit was then energized. The test was continued for 5 minutes, or until ignition, or a hole through the specimen occurs.

High voltage arc resistance to ignition performance level categories (PLC)

| HVAR Range - Mean Time to Ignition (sec) | Assigned PLC |
|---|---|
| 300 ≦ TI | 0 |
| 120 ≦ TI < 300 | 1 |

-continued

| HVAR Range - Mean Time to Ignition (sec) | Assigned PLC |
|---|---|
| 30 ≦ TI < 120 | 2 |
| 0 ≦ TI < 30 | 3 |

TABLE VIII (Results)

| Sample | Time to Ignite (sec) |
|---|---|
| 1 | >300 |
| 2 | >300 |
| 3 | >300 |

It is appreciated by those skilled in the art that various changes and modifications can be made to the illustrated embodiments without departing from the spirit of the invention. All such modifications and changes are intended to be covered by the appended claims.

What is claimed is:

1. An electronic device package assembly, comprising:
   an electronic device having a front side, rear side, left side, right side, bottom side, top side and at least two wire leads, said wire leads emanating from said electronic device; and
   a molded cover injection molded about said electronic device and in thermal communication with at least said front side, rear side, left side, right side, and top side of said electronic device,
   said wire leads emanating from said electronic device and protruding through said molded cover,
   said molded cover comprising a thermally-conductive, electrically-insulating polymer composition having a thermal conductivity of at least 22 W/m°K, comprising a uniform mixture of:
   about 30% by weight of a polymer matrix,
   about 60% by weight of a thermally-conductive, electrically-insulating ceramic material dispersed intimately throughout said polymer matrix and
   about 10% by weight of a reinforcing material dispersed intimately throughout said polymer matrix.

2. The package assembly of claim 1, wherein the polymer matrix is a thermoplastic polymer.

3. The package assembly of claim 2, wherein the polymer matrix is polyphenylene sulfide.

4. The package assembly of claim 1, wherein the thermally-conductive, electrically-insulating ceramic material is selected from the group consisting of alumina, calcium oxide, titanium oxide, silicon oxide, zinc oxide, silicon nitride, aluminum nitride, boron nitride, and mixtures thereof.

5. The package assembly of claim 1, wherein the reinforcing material is glass.

* * * * *